(12) United States Patent
Banks

(10) Patent No.: US 7,921,644 B2
(45) Date of Patent: Apr. 12, 2011

(54) POWER TRANSMISSION FOR A THERMAL ELASTIC WIRE

(76) Inventor: Ridgway M. Banks, Crockett, CA (US)

( * ) Notice: Subject to any disclaimer, the term of this patent is extended or adjusted under 35 U.S.C. 154(b) by 553 days.

(21) Appl. No.: 12/148,417

(22) Filed: Apr. 18, 2008

(65) Prior Publication Data

US 2009/0260356 A1    Oct. 22, 2009

(51) Int. Cl.
*F01B 29/10* (2006.01)
(52) U.S. Cl. ............................... 60/527; 60/528
(58) Field of Classification Search ............. 60/527–529
See application file for complete search history.

(56) References Cited

U.S. PATENT DOCUMENTS

| | | | | | |
|---|---|---|---|---|---|
| 2,574,993 | A | * | 11/1951 | White | 60/529 |
| 2,594,528 | A | * | 4/1952 | White | 60/529 |
| 4,563,876 | A | * | 1/1986 | Banks | 60/527 |

* cited by examiner

*Primary Examiner* — Hoang M Nguyen
(74) *Attorney, Agent, or Firm* — Brian Beverly; Beeson Skinner Beverly

(57) ABSTRACT

A power transmission for a thermal elastic wire including a frame for supporting a pair of anchor posts which stretch said wire there between. One of the posts being pivoted in the frame and having an extension arm projecting therefrom towards the other post. A spring biased rotator drum is rotatably supported in the frame proximate to the end of the extension arm. A flexible connection interconnects the periphery of the rotator drum with the end of the extension arm of the pivoted anchor post. A power takeoff connection on the rotator drum is provided for the attachment of a connecting link there to whereby as the thermal elastic wire changes phase, a smooth power stroke can be extracted from the transition at the power takeoff connection and stored in a spring.

8 Claims, 2 Drawing Sheets

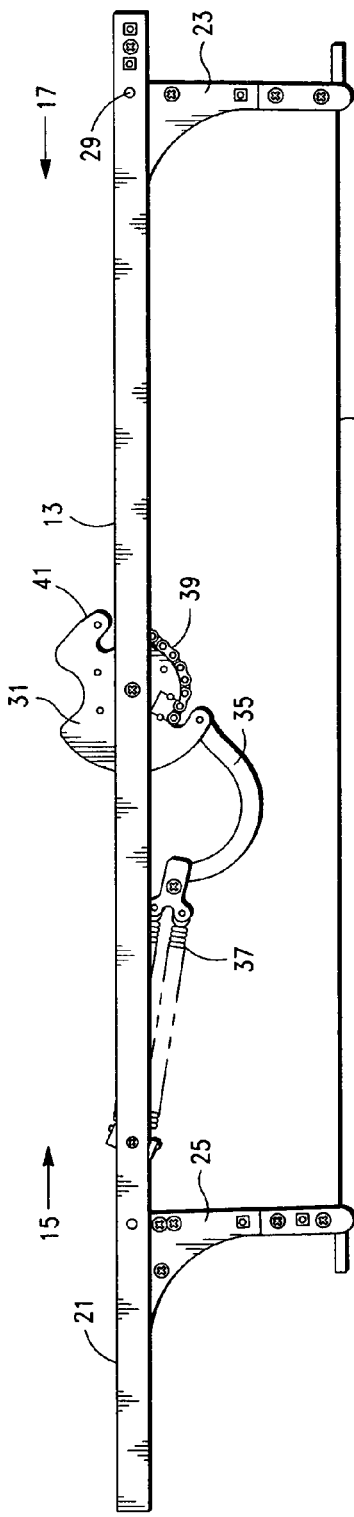
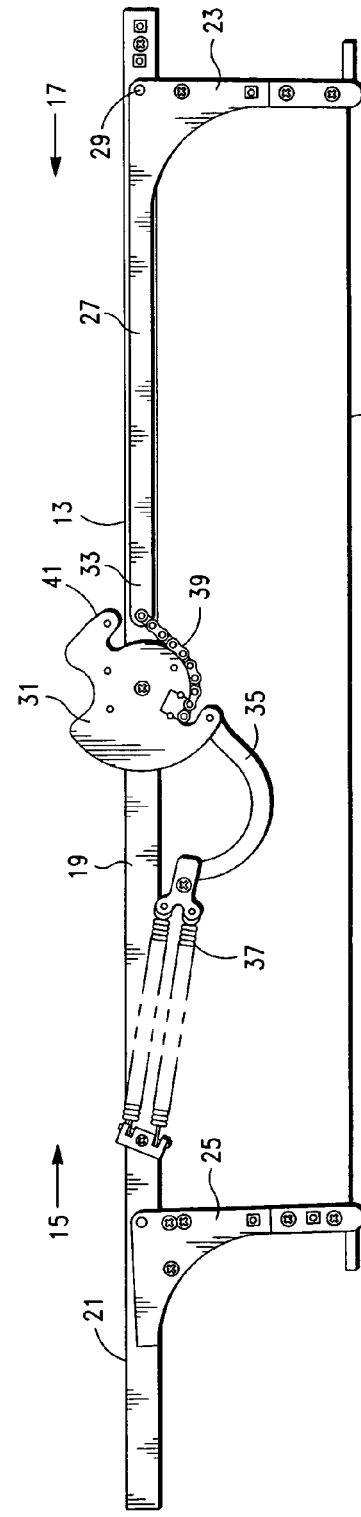

POWER TRANSMISSION FOR A THERMAL ELASTIC WIRE

BACKGROUND OF THE INVENTION

1. Field of the Invention

The present invention relates to an apparatus for extracting usable energy from a thermal elastic wire. More particularly, the present invention is a power transmission device which accommodates the physical change rate of a thermal elastic wire as it changes phase to permit the extraction of usable energy from the phase transition. Still more particularly, the present invention is a power transmission which extracts and stores energy from a thermal elastic wire without overstressing the wire during its rapid shortening phase change. Specifically, the present invention is a power transmission which extracts and absorbs energy from a thermal elastic wire due to the wire shortening at a variable rate during phase change of the wire and outputs a smooth power stroke.

2. Description of the Prior Art

The use of energy transfer mechanisms in one form or another for the purpose of producing work from thermal elastic material transformations is known in the prior art. However, despite the numerous designs, structures, forms of apparatus, and variety of methods disclosed by and utilized in the prior art, which have been developed for the accomplishment of the specific objectives, purposes, and requirements of harnessing thermal elastic phase changes, the devices, machines, constructions, and methods which have been heretofor devised and utilized to accomplish these goals consist basically of familiar, expected, and obvious configurations, combinations, and arrangements of well known structural forms and apparatus. This will become apparent from the following consideration of the closest known and relevant prior art.

The inventor of the present invention is also the inventor of the Banks Engine, U.S. Pat. No. 3,913,326, issued Oct. 21, 1975, which was the first proven reliable thermal elastic wire powered engine. The Background of the Invention section of that patent sets forth in part the status of the prior art at the time of that invention. The "Summary of the Invention" section of that patent describes the thermodynamic working material as a thermally responsive memory material which is the same as used to power the transmission of the present invention.

An improved version of the Banks engine was patented in 1981 under U.S. Pat. No. 4,257,231, issued Mar. 24, 1981. The Banks engines are powered by thermal elastic wires which change phase when subjected to different temperature environments. The phase changes elongate and shorten the wires. By alternating the wire environments, work can be extracted from the wires under controlled conditions.

The thermal elastic energy power transmission contemplated according to the present invention departs substantially from the conventional concepts and designs taught and used by the prior art, and in doing so, provides an apparatus primarily developed for the purpose of overcoming the problems as described above, but it accomplishes the result in a different and improved manner for producing usable work more efficiently, conveniently, faster, and economically

SUMMARY OF THE INVENTION

There are many problems in developing a thermal elastic material powered engine to produce useful energy output. The problems also make it difficult to devise a reliable and practical energy extraction mechanism. There are basically three different problems which are interrelated and have inhibited the development of functional thermal elastic material powered engines.

The first problem is one of heat transfer. In order to effect the phase change of the thermal elastic material, it is necessary for the heat transfer to be accomplished relatively uniformly and quickly throughout the material. Otherwise, undesirable stresses occur which can destroy the material. Thus, an effective means for thermally cycling the material must be provided. The means provided so far has kept the thickness of the material quite thin rather than trying to increase the effectiveness of the heat transfer from the heat source to the interior of the material.

Further, the best way of achieving effective heat transfer is by using thin round wires to obtain the maximum heat transfer area for the material so the heat source can surround the wire and does not have to penetrate very far into the material. It is possible that the heat in a primary source could be transferred to a second medium, which has a more effective heat transfer property, to transfer heat into the material and remove it, but at the present time such a medium is not known. Therefore, it seems that any machine which has is to be powered by a thermal elastic material will have to be powered by thin wires which causes a severe design parameter limitation.

The second problem has to do with the fact a straight wire configuration has two major problems in itself. The first of these is that a straight wire only develops power in one direction and that occurs when it is heated, passes through the phase change, and shortens. This is the power stroke. When it is thermally cycled back below the phase change temperature, the wires simply goes slack. The problem is how to take up the slack to put the wire back into position for providing a power stroke. In addition, the wire provides no power for doing so when it goes slack since in longitudinal compression and just bends.

The third problem, and most challenging and complex, is the fact that once the phase change temperature in the thermal elastic wire is reached, a change of length of the wire occurs very rapidly although it appears not to be instantaneous. Thus, if a thermal elastic wire is restrained in tension to affect a power stroke, and is then heated above the phase change temperature, it shortens dramatically in a short period of time and the mechanism which is to extract the power from the shortening process must accommodate the rapid shortening.

The power extracting mechanism needs to utilize the strength of the wire to deliver the power and yet not overstress the wire beyond its natural deformation during the phase change process. If the wire is mechanically deformed during the shortening cycle, by restraining it too severely and stretching it, the wire will ultimately fatigue and fail. Thus, it is necessary that a very sophisticated mechanism be utilized to extract the power from the wire which will be able to absorb considerable energy in a short period of time and then convert that energy due to the phase change to useful motion.

The second Banks engine solves these problems with a complicated mechanism requiring alternating baths of hot and cold liquid to effect the phase changes in the wire. In an effort to simplify the mechanism, it was considered desirable to attempt to cool the wire in the air rather than a water bath. It has been determined that such can be done by the unique mechanism of the present invention thereby eliminating the need for a cooling bath.

In view of the foregoing known, obvious, and described disadvantages inherent in the various types of thermal energy power extraction transmissions for thermal elastic materials presently existing in the prior art, the present invention provides a new apparatus, and construction for a power transmission for a thermal elastic wire wherein the same can be utilized to provide a smooth power output from a phase change of the wire which can be efficiently harnessed. In addition, the relaxation phase can be cooling in an air bath. Neither of these features is taught by the prior art.

The general purpose construction of the present invention, which will be described hereafter in greater detail, has been designed, is to provide a new and improved power transmission apparatus for thermal elastic wires which has many of the advantages of the prior art of power extraction transmissions mentioned and described above. It is comprised of many novel features and advantages and performs the functions that result in a new power transmission for a thermal elastic wire which is not anticipated, rendered obvious, suggested, or even implied by any of the prior art of power absorption and transmission for thermal elastic materials, and heretofore known, either alone or in any combination thereof.

The present invention is a frame for supporting a pair of anchor posts which stretch a thermal elastic wire there between. One of the posts is pivoted in the frame and has an extension arm projecting therefrom towards the other post. A spring biased rotator drum is rotatably supported in the frame proximate to the end of the extension arm. A flexible connection interconnects the periphery of the rotator drum with the end of the extension arm of the pivoted anchor post. A power takeoff connection on the rotator drum is provided for the attachment of a connecting link there to whereby as the thermal elastic wire changes phase, a smooth power stroke can be extracted from the transmission at the power takeoff connection and stored in a spring.

The more important features of the invention have been broadly outlined in the preceding summary of the invention in order that the detailed description thereof which follows may be better understood and in order that the present contribution to an improvement in the art may be better appreciated. There are additional features of the invention that will be described hereinafter and which will form the subject matter of the claims appended hereto.

With respect to the claims hereof, and before describing at least one preferred embodiment of the invention in detail, it is to be understood that the invention is not to be limited in its application to the details of construction and to the arrangements of the components which are set forth in the following description or illustrated in the accompanying drawings. The invention is capable of being created in other embodiments and of being practiced and carried out in various ways. Also, it is to be understood that the phraseology and terminology employed here are for the purpose of description and should not be regarded as limiting.

As such, those skilled in the art in which the invention is based will appreciate that the conception upon which this disclosure is predicated may readily be utilized as a basis for the designing of other forms, structures, apparatus, systems, and methods for carrying out the several purposes of the present invention. It is important, therefore, that the claims be regarded as including such equivalent constructions in so far as they do not depart from the spirit and scope of the present invention.

Further, the purpose of the appended abstract is to enable the United States Patent and Trademark Office, and the public generally, and especially scientists, engineers, and practitioners of the art who are not familiar with the patent and legal terms or phraseology, to determine quickly from cursory inspection the nature and essence of the technical disclosure of the application. The abstract is neither intended to define the invention of the specification, which is measured by the claims, nor is it intended to be limiting as to the scope of the invention in any way.

OBJECTS OF THE INVENTION

It is therefore an important object of the present invention to provide a power transmission for the phase change of a thermal elastic wire.

It is another object of the present invention to provide a power transmission for a thermal elastic wire which provides a smooth power stroke for the extraction of work.

It is a further object of the present invention to provide a power transmission for a thermal elastic wire which absorbs the differing rates of phase change to protect the thermal elastic wire from strain.

It is still another object of the present invention to provide a power transmission for a thermal elastic wire which can be ganged with multiple such transmissions for multiplying the power output.

And it is yet a further object of the present invention to provide a power transmission for thermal elastic wire which can be air cooled to effect phase change in the wire.

Other objects and advantages of the present invention will become apparent when the method and apparatus of the present invention are considered in conjunction with the accompanying drawings.

DESCRIPTION OF THE DRAWINGS

The invention is illustrated in the accompanying drawings but not limited by reference to the particular embodiments shown therein of which:

FIG. 1 is a side elevation of the power transmission of the present invention;

FIG. 2 is same view of FIG. 1 with the near side rail removed; and

DESCRIPTION OF THE PREFERRED EMBODIMENT

Figure 3:
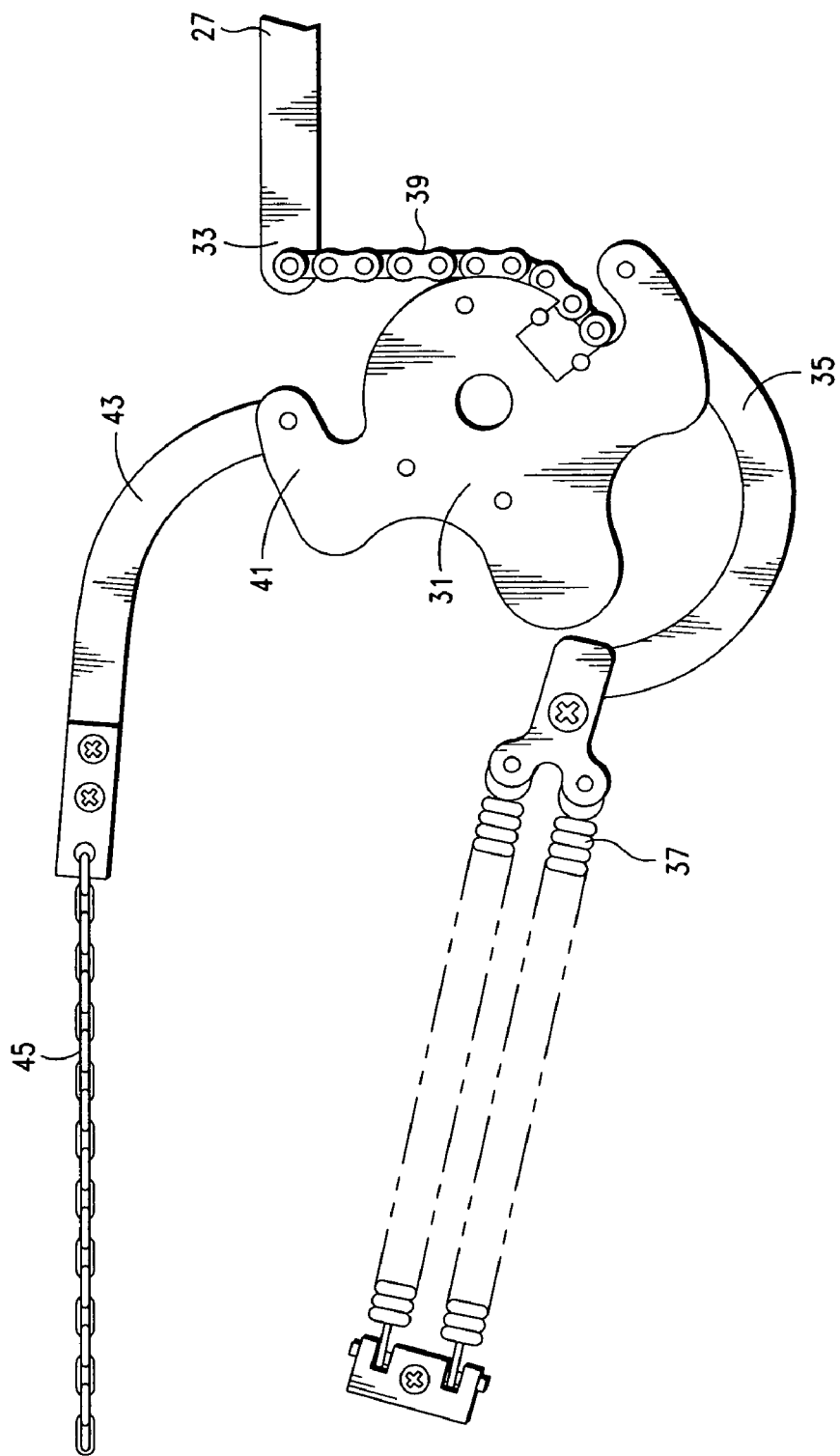
FIG. 3 is a side elevation view of the rotator drum broken out from the transmission.

Reference is made to the drawings for a description of the preferred embodiment of the present invention wherein like reference numbers represent like elements on corresponding views.

FIGS. 1 & 2 show a power transmission unit for a thermal elastic wire 11. The transmission is comprised of a mainframe beam 13 having an intermediate operative portion 15, 17 disposed between the ends thereof. A pair of siderails 19 support the operative elements of the mechanism which can be seen in FIG. 2 in which the near side siderail has been removed. The end of the side rails form an extension member 21 which can be clamped in the mechanism being powered by the transmission.

The operative portion 15, 17 of the transmission is that part of the mainframe 13 which contains or supports the operative elements of the mechanism. The side rails 19 contain and provide the support for the elements. The extension member 21 at one end of the mainframe from the operative portion is provided to permit the transmission to be mounted in a mechanism which lifts the thermal elastic wire 11 from a hot liquid bath for air cooling (relaxation/lengthening phase change) and lowers the wire into the hot bath to create the wire phase change (shortening) which results in a power stroke from the thermal elastic wire.

A pair of opposed anchor posts 23, 25 are captured between the side rails 19 of the mainframe beam 13 and disposed proximate to the opposite ends of the operative portion 15, 17 of the beam. The posts project effectively perpendicular to the beam and have the free ends thereof adaptable to securing a thermal elastic wire 11 there between. At least one of the posts can be made adjustable along said beam to permit predetermined lengths of wire to be strung between the posts and the distance between the posts thereby adjusted to set the tension in the wire. Alternatively, the posts can be fixed in position and the length of the wire adjusted by stops clamped to the wire outside the posts to set the tension. Short lengths of soft tubing can be swaged onto the wire for this purpose or removable wire encircling tubular members can be utilized with set screws to clamp the wires in the members.

The first of the anchor posts 23 has an extension arm 27 extending at effectively a right angle there from. The arm is disposed between the side rails 19 of the mainframe beam 13 and projects toward the second anchor post 25. The extension arm of the anchor post is pivoted 29 at the junction or knee of the post and the extension arm, between the rails, for facilitating oscillating partial rotational (rocking) movement thereof. The length of the wire strung between the posts is adjusted so that when it is relaxed, the end of the extension arm resides between the side rails.

A rotator drum 31, shown broken out in FIG. 3, is disposed between the side rails 19 of the beam 13 and positioned between the posts 23, 25 proximate to the free end 33 of the extension arm 27 of the first anchor post 23. The drum is pivoted for oscillating partial rotational movement between the mainframe beam side rails.

A connecting rod 35 has one end thereof pivotally connected to the rotator drum 31. The opposite end of the rod extends toward the second of the anchor posts 25. The connecting rod is curved so that when the rotator drum is partially rotated during wire shortening, the connecting rod conforms in part to the peripheral surface of the rotator and permits greater angular rotation of the rotator drum than would a straight connecting rod.

A spring member 37 is pivotally attached at one end thereof to the opposite end of the connecting rod. The other end of the spring member is pivotally secured between the side rails 19 of the mainframe beam 13 at a position between the rotator drum 31 and the second anchor post 25. The spring member of the power transmission is comprised of at least one elongated flexible coil spring which fits between the side rails. The spring member absorbs the energy of the wire shortening.

In the preferred embodiment of the invention, a pair of coils springs are employed for this purpose. The main reason for the dual springs is to allow a narrower diameter coiled spring to be employed than if a single coil spring were utilized to obtain the same mechanical advantage. The narrower diameters allow a thinner mainframe beam to be employed in the transmission whereby more transmissions can be arrayed in a given length of holder for a parallel series of transmissions. The two ends of the spring pair are secured to rotational anchors which allow the ends of the springs to oscillate to keep the springs straight in line with the end of the connecting rod thereby eliminating any dissipation of energy which would be extracted from the thermal elastic wires by lateral movement of the springs.

An elongated flexible connection 39 is wrapped around a portion of the periphery of the rotator drum 31 and has one end thereof anchored to the drum. The other end thereof is attached to the end 33 of the first anchor post extension arm 27 disposed between the mainframe beam 13 side rails 19 whereby as the first anchor post 23 oscillates to raise the end of the anchor post extension arm, the rotator drum is rotationally oscillated. The flexible connection in the preferred embodiment of the invention is a micro bicycle link chain. It could as easily be a wire, a metal or fiber strap, or any other material with comparable flexibility and strength.

Reference is made to FIG. 3. A power takeoff connection 41 is provided on the rotator drum 31 for attachment of a connecting link 43 there to. The connecting link is pivotally secured to the rotator drum and curved like the connecting rod 35 so that it too partially conforms to the peripheral surface of the rotator drum during power extraction by the transmission when the springs 39 shorten pulling on the connecting link and thereby on an output link 45 such as a chain or flexible connector. The power takeoff connection of the power transmission is disposed generally on the opposite side of the rotator drum from the connecting rod connection to the rotator drum.

In operation, the transmission thermal elastic wire 11 is dipped in a liquid heat source which typically is hot water. The wire shortens, usually while in a horizontal orientation, pulling on the lower end of the first anchor post 23, which is movable due to its pivoted connection 29 to the mainframe beam 13. The shortening of the wire lifts the extension arm 27 of the anchor post residing between the side rails 19 of the beam. The raising of the extension arm pulls on the flexible connection 39 wrapped around a portion of the periphery of the rotator drum 31 causing it to rotate a partial turn. This action is relatively rapid and faster than it can be absorbed by the mechanism mechanically without overstressing the thermal elastic wire 11, so the partial rotation is resisted and the energy absorbed by the spring member 37. The spring member in turn exerts force on the power takeoff connection 41, through the connecting rod 35, and thereby on the output link 45. When the wire is raised from the heat source, it air cools and changes phase to lengthen. The energy stored in the spring member is smoothly released in a constant pull on the connecting rod through the rotator mechanism to the output link. This action in turn is coupled in the usual case with other transmissions both in and out of phase change with the subject transmission.

Thus it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

I claim:

1. A power transmission for a thermal elastic wire comprising a mainframe beam having an intermediate operative portion, a pair of side rails, and forming an extension member a pair of opposed anchor posts captured between said side rails and disposed proximate to the opposite ends of said operative portion of said beam, said posts projecting effectively perpendicular to said beam and having the free ends thereof adaptable to securing a wire there between, the first of said anchor posts having an extension arm projecting at effectively a right angle there from toward said other post and disposed between said side rails of said beam, said extension arm pivoted at the junction of said first post and said extension arm disposed between said rails for facilitating oscillating partial rotational movement thereof, a rotator drum disposed between said side rails of said beam and positioned between said posts proximate to the free end of said extension arm of said first anchor post, said drum being pivoted for oscillating partial rotational movement between said side rails, a connecting rod having one end thereof pivotally connected to said rotator drum and the opposite end of said rod extending toward the second of said anchor posts, a spring member pivotally attached at a first end thereof to said opposite end of said connecting rod, the second end of said spring member being pivotally secured between said side rails of said beam at a position between said rotator drum and said second anchor post, an elongated flexible connection wrapped around a portion of the periphery of said rotator drum and having one end thereof anchored to said drum and the other end thereof attached to the end of said first anchor post extension arm disposed between said beam side rails whereby as said first anchor post oscillates to move said end of said anchor post extension arm, said rotator drum is rotationally oscillated, and a power takeoff connection on said rotator drum for attachment of a connecting link there to.

2. The power transmission of claim 1 wherein said connecting rod is curved to conform to a portion of the external surface of said rotator drum.

3. The power transmission of claim 1 wherein said spring member is comprised of at least one elongated flexible coil spring which fits between said side rails of said beam.

4. The power transmission of claim 1 wherein said flexible connection is a bicycle type link chain.

5. The power transmission of claim 1 wherein said power takeoff connection is disposed generally on the opposite side of said rotator drum from said connecting rod connection to said rotator drum.

6. The power transmission of claim one wherein said connecting link is curved to conform to a portion of the external surface of said rotator drum.

7. The power transmission of claim 1 wherein at least one of said anchor posts can be adjustably positioned along said beam.

8. A power transmission for a thermal elastic wire comprising a mainframe beam having an intermediate operative portion, a pair of side rails, and forming an extension member a pair of opposed anchor posts captured between said side rails and disposed proximate to the opposite ends of said operative portion of said beam, at least one of said anchor posts being adjustably positionable along said beam, said posts projecting effectively perpendicular to said beam and having the free ends thereof adaptable to securing a wire there between, the first of said anchor posts having an extension arm projecting at effectively a right angle there from toward said other post and disposed between said side rails of said beam, said extension arm pivoted at the junction of said first post and said extension arm disposed between said rails for facilitating oscillating partial rotational movement thereof, a rotator drum disposed between said side rails of said beam and positioned between said posts proximate to the free end of said extension arm of said first anchor post, said drum being pivoted for oscillating partial rotational movement between said side rails, a connecting rod having one end thereof pivotally connected to said rotator drum and the opposite end of said rod extending toward the second of said anchor posts, said connecting rod being curved to conform to a portion of the external surface of said rotator drum, a spring member pivotally attached at a first end thereof to said opposite end of said connecting rod, the second end of said spring member being pivotally secured between said side rails of said beam at a position between said rotator drum and said second anchor post, said spring member being comprised of at least one elongated flexible coil spring which fits between said side rails of said beam, a bicycle type link chain wrapped around a portion of the periphery of said rotator drum and having one end thereof anchored to said drum and the other end thereof attached to the end of said first anchor post extension arm disposed between said beam side rails whereby as said first anchor post oscillates to move said end of said anchor post extension arm, said rotator drum is rotationally oscillated, and a power takeoff connection on said rotator drum for attachment of a connecting link there to, said connecting link being curved to conform to a portion of the external surface of said rotator drum, said power takeoff connection being disposed generally on the opposite side of said rotator drum from said connecting rod connection to said rotator drum.

* * * * *